S. G. STEVENS.
SOIL CULTIVATOR.
APPLICATION FILED APR. 20, 1912.
1,063,079.
Patented May 27, 1913.
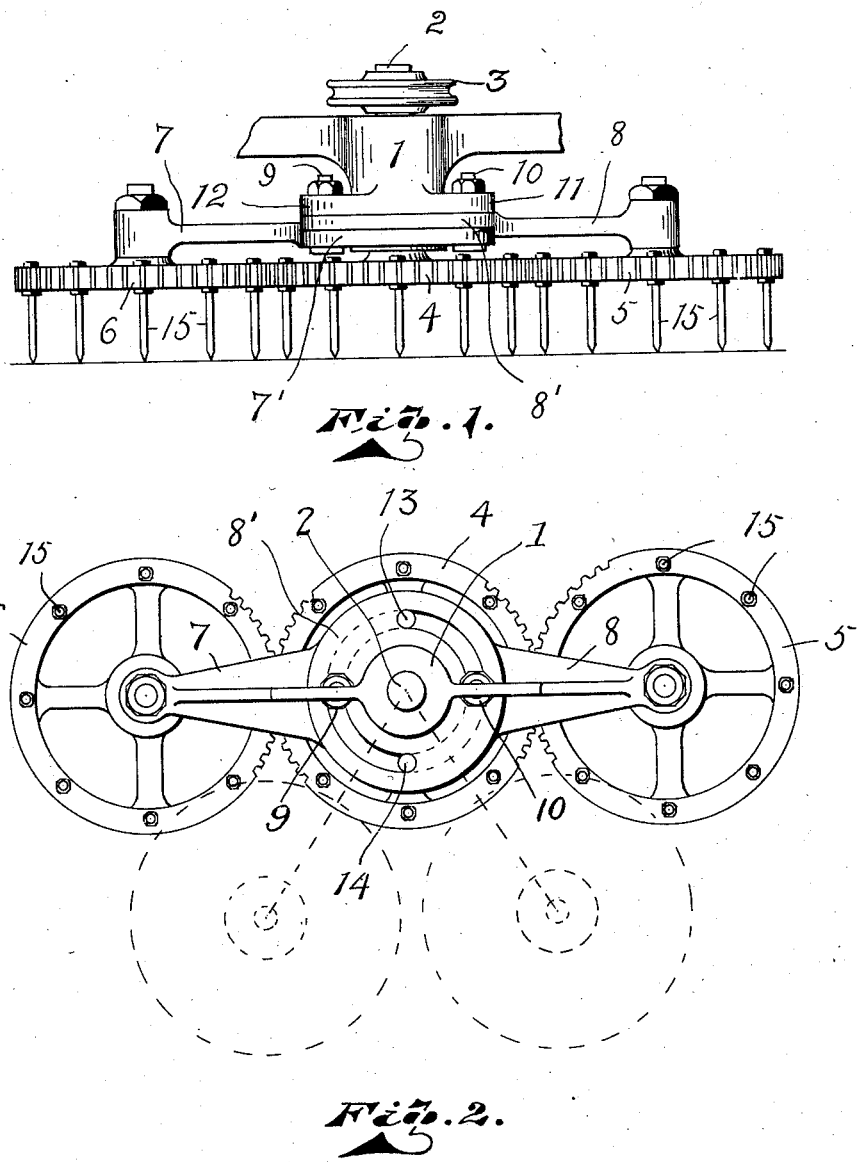

UNITED STATES PATENT OFFICE.

SYLVESTER GEORGE STEVENS, OF DULUTH, MINNESOTA.

SOIL-CULTIVATOR.

1,063,079.   Specification of Letters Patent.   Patented May 27, 1913.

Application filed April 20, 1912. Serial No. 692,162.

*To all whom it may concern:*

Be it known that I, SYLVESTER GEORGE STEVENS, a citizen of the United States, residing at Duluth, in the county of St. Louis and State of Minnesota, have invented certain new and useful Improvements in Soil-Cultivators, of which the following is a specification, reference being had therein to the accompanying drawing.

My invention relates to improvements in soil cultivators, and particularly to horizontal revoluble adjustable soil cultivators, and has for its object to provide such a cultivator that may be quickly and easily adjusted to cultivate strips of soil of different widths such as between rows of vegetation and the like.

Another object is to provide a cultivator having soil engaging elements operating in many different directions to thoroughly break up all particles of the soil over which the cultivator passes and one of exceedingly simple construction and few parts.

In the accompanying drawings Figure 1 is a rear elevation of my improved cultivator. Fig. 2 is a top view of the same, with the driving sheave omitted for convenience of illustration.

It will be understood that this form of soil cultivator may be attached in any desired manner to any form of cultivating machine from which power may be transmitted thereto, as the particular form of cultivating vehicle does not enter into my present invention.

1 represents a vertically disposed journal box which may be attached to a cultivating vehicle in any desired manner, and revolubly carries therein the vertical shaft 2, which is revolved by means of a sheave 3 or other suitable connection from the power of the cultivator machine or vehicle. Upon the lower end of the shaft 2 is fixed the gear wheel 4, which meshes with and operates two similar gear wheels 5 and 6, which are pivotally supported by means of radial arms 8 and 7, pivotally adjustably attached to the lower extremity of the journal box 1 and which they surround, being held in position by bolts 9 and 10 passing through the lugs 12 and 11 formed integral with the box 1.

The hub portions 7′ and 8′ of the radial arms 7 and 8 which surround the box 1 are formed with segmental slotted holes 13 and 14 through which the bolts 9 and 10 pass and which admit of the arms 7 and 8 being swung radially when the bolts 9 and 10 are slackened, so that they may be placed in any position desired, such as shown in dotted lines Fig. 2 or any modification thereof, the gears at all times remaining in mesh and the two outside ones being revolved in the same direction by the inside one traveling in the opposite direction.

The soil cultivating teeth 15 are fastened to the wheels 4, 5 and 6 in any convenient manner and are preferably made of some suitable spring material to avoid bending or breaking, and there may be any number of them desired.

While I have shown the three intermeshing cultivating wheels all of the same size for convenience of illustration, it is evident that these may be altered considerably with varying results, as for instance, if the intermediate wheel was made half the diameter of the outside ones, then the latter would travel at half the speed of the center wheel which is sometimes desirable in some classes of cultivation, and this would also give a greater maximum sweep to the cultivator. Again if the outside wheels were made smaller than the intermediate wheel, they would travel faster in proportion which again is sometimes desirable in some class of cultivation and the minimum sweep of the machine would be altered. Still again, the cultivating teeth may be left off the intermediate wheel and allowed to straddle the row of vegetation and the two outside wheels adjusted to cultivate far or near upon each side of the row, and still again, the two outside wheels may be left off entirely and any sized center wheel with any form or number of teeth attached to cultivate as desired.

From the foregoing, it is evident I have devised a soil cultivating element applicable to any vehicle from which power may be derived for operating the cultivator, of exceedingly simple construction and one with a wide range of adjustment.

Having thus described my invention, what I claim and desire to secure by Letters Patent is:

1. A soil cultivator, comprising a horizontally revoluble wheel, two similarly horizontally revoluble wheels operated by the first mentioned wheel and supported radially adjustable therefrom, and soil cultivating elements depending from said wheels.

2. A soil cultivator comprising a central and two side horizontally arranged intermeshing wheels adapted to carry depending soil cultivating teeth, swinging supporting members for the side wheels, the supporting members swinging on an axis concentric with the axis of the center wheel for the purpose described.

3. A soil cultivator comprising a central horizontally arranged revoluble wheel, adapted to carry depending soil cultivating teeth, the wheel connected with means through which rotary motion may be imparted to the wheel, a swinging wheel support swinging on an axis concentric with the axis of a center wheel, the support projecting beyond the periphery of the center wheel, a horizontally revoluble wheel supported on a vertical axis at the outer end of the support and meshing with the center wheel, and means for clamping the swinging support at any desired angle to the line of draft of the cultivator.

4. A soil cultivator comprising a central revoluble wheel adapted to carry depending soil cultivating teeth, a support for the said wheel, an extending swinging side wheel support carried by the center wheel support and swinging on an axis concentric with the axis of the center wheel, means for holding the swinging support in its adjusted position, said wheels carrying means through which rotary motion may be imparted to them for the purpose described.

5. A soil cultivator, comprising a cultivator wheel support, a center horizontally arranged revoluble wheel journaled in said support and adapted to carry depending cultivating teeth, two swinging arms extending from said support and projecting beyond the periphery of the center wheel, horizontally revoluble wheels journaled at the outer ends of the swinging arms, means for holding the swinging arms at their adjusted position, said wheels provided with means by which rotary motion may be imparted thereto for the purpose described.

6. A soil cultivator, comprising a plurality of horizontally revoluble wheels operated in unison and provided with adjustably removable depending soil-engaging elements.

In testimony whereof I hereunto affix my signature in the presence of two witnesses.

SYLVESTER GEORGE STEVENS.

Witnesses:
H. W. COFFIN,
ALEXANDER McDOUGALL.

---

Copies of this patent may be obtained for five cents each, by addressing the "Commissioner of Patents Washington, D. C."